United States Patent [19]

Myers et al.

[11] 4,005,850
[45] Feb. 1, 1977

[54] FLOOR JACK

[75] Inventors: Walter I. Myers, Tulsa; Edgar R. Goodbary, Cardin; Richard L. Thomas, Tulsa; Billy W. Lewis, Cardin, Francis A. Bartley, Cardin, all of Okla.

[73] Assignee: Goodbary Engineering Co., Tulsa, Okla.

[22] Filed: Aug. 4, 1975

[21] Appl. No.: 601,928

Related U.S. Application Data

[63] Continuation-in-part of Ser. No. 458,504, April 8, 1974, abandoned.

[52] U.S. Cl. .............................................. 254/2 R
[51] Int. Cl.² ........................................... B60P 1/00
[58] Field of Search .......... 254/2 R, 2 B, 2 C, 8 R, 254/8 B, 8 C, 93 R; 187/9; 180/2, 53

[56] References Cited

UNITED STATES PATENTS

| | | | |
|---|---|---|---|
| 2,795,346 | 6/1957 | Farmer | 254/2 R |
| 3,005,562 | 10/1961 | Shaffer | 187/9 |
| 3,307,656 | 3/1967 | Susag | 187/9 |
| 3,647,183 | 3/1972 | Rishord | 254/2 B |
| 3,774,726 | 11/1973 | Bredberg | 187/9 |
| 3,787,030 | 1/1974 | Bieka | 254/8 R |

Primary Examiner—James L. Jones, Jr.
Assistant Examiner—Robert C. Watson
Attorney, Agent, or Firm—Head, Johnson & Chafin

[57] ABSTRACT

A self-propelled floor jack for intermittently lifting substantially great loads and comprising base element means supported by propelling wheel means, lift means selectively engagable with the load, positive-lock pawl and ratchet means cooperating with the lift means for locking thereof in preselected elevated positions, bell crank and lever means operably connected with the lift means for determining the travel path therefor, and steering and control means operable for propelling and actuating the apparatus.

4 Claims, 10 Drawing Figures

FLOOR JACK

CROSS-REFERENCE TO RELATED APPLICATION

This is a continuation-in-part application of our co-pending application Ser. No. 458,504, filed Apr. 8, 1974, now abandoned, and entitled Floor Jack.

BACKGROUND OF THE INVENTION

1. Field of the Invention

This invention relates to improvements in lifting apparatus and more particularly, but not by way of limitation, to a self-propelled floor jack apparatus for lifting substantially great loads.

2. Description of the Prior Art

Many extremely large off-highway vehicles are in wide spread use today that have been designed for handling large tasks, such as multi-ton ore haulers used in open pit mining, and the like, which carry loads previously requiring many vehicles. These large vehicles greatly increase the speed of ore recovery and reduce the overall cost thereof, which is very important in the industry. However, the large dimensions of the vehicles combined with the great weights thereof render the maintenance of this equipment very difficult, particularly since many servicing operations may be greatly enhanced by lifting the equipment for facilitating access to the portion thereof to be serviced. For example, the tires utilized on these large pieces of equipment are correspondingly large and expensive, and the great weights carried by the tires result in relatively low useful mileage therefor, and normally the tires must be frequently repaired or replaced.

Whereas there are many lifting device, floor jacks, and the like, available today which are adapted for engaging the axle, frame, or the like, of a vehicle for elevating thereof in a substantially conventional manner, the large size and weight of these large pieces of equipment result in the fact that they are not readily adapted to manipulation by the usual present day lifting devices. As a consequence, relatively elemental and crude blocking methods are normally used at present for supporting portions of these vehicles in elevated positions during servicing or maintenance thereof.

SUMMARY OF THE INVENTION

The present invention contemplates a novel self-propelled floor jack that has been particularly designed and constructed for overcoming the above disadvantages. The novel jack apparatus comprises a base element carried by suitable propelling wheels which are operably connected with a suitable power source for facilitating propelling or maeuvering of the apparatus around the work or servicing area. As a matter of convenience, the wheel motor is preferably a hydraulic motor, operably connected with an air motor for actuation thereof since vast quantities of air are usually readily available at sites wherein this type equipment is used. Steering means is connected with the wheels for facilitating the maneuvering of the apparatus, and suitable pads are preferably provided for the base element for engagement with the ground during lifting operations.

A hydraulic cylinder is suitably mounted on the base element and connected with a lifting mechanism by bell crank and lever means which have been particularly designed for determining the desired path of travel for the lifting mechanism during the raising and lowering thereof. For many uses, it is desirable that the lifting mechanism move substantially vertically, but there is no intention of limiting the invention to this precise movement for the lifting mechanism. There are many instances wherein other movements for the lifting mechanism may be desirable, and the linkage ratios may be selected to achieve substantially any desired travel path therefor. In addition, pawl and ratchet means are provided for a positive locking action to secure the lifting apparatus in substantially any desired or preselected elevated position. Control means is provided for disengagement of the locking pawl from the ratchet for permitting lowering of the lifting mechanism, and of course, suitable control means is provided for actuation of the hydraulic cylinder and wheel motor. It is preferable to provide a platform area on the apparatus for supporting the operator thereof, but the overall compact size of the jack apparatus will permit use of the apparatus with the smallest of off-highway vehicles, or the like, as readily as with the largest of these vehicles. The novel floor jack is simple and efficient in operation and economical and durable in construction.

DESCRIPTION OF THE PREFERRED EMBODIMENT

Figure 2:
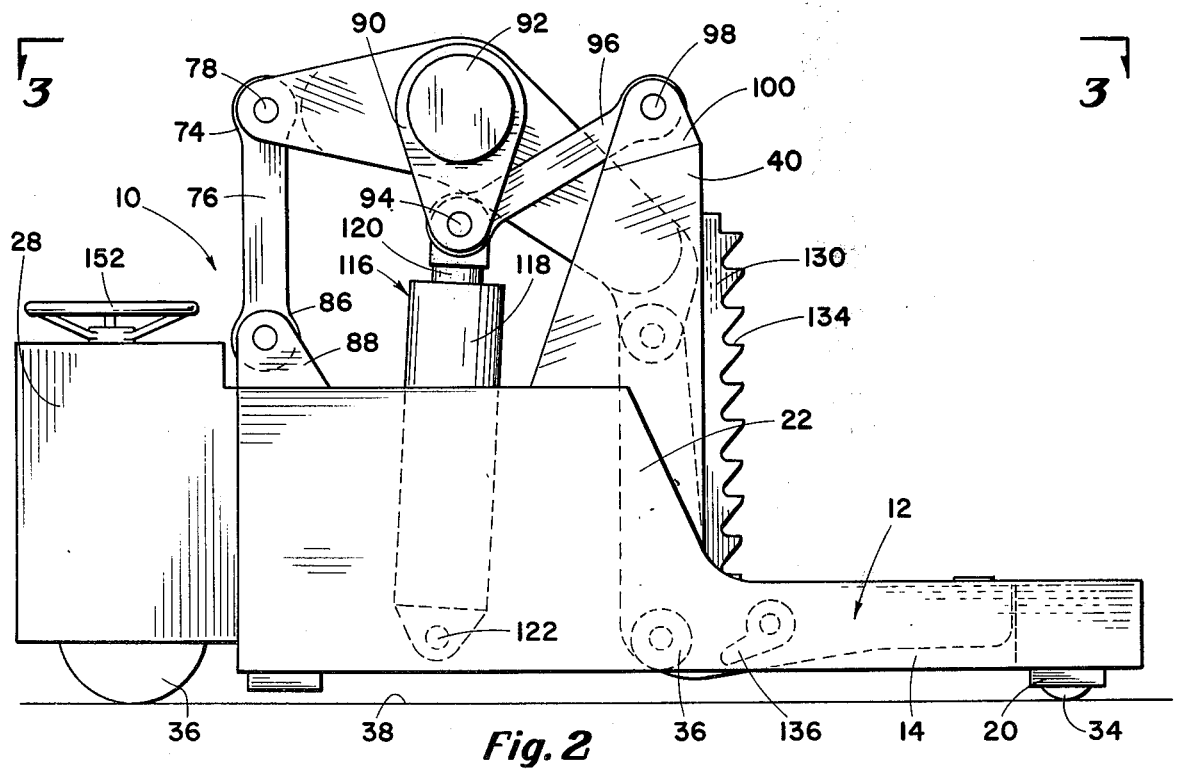
FIG. 2 is a view similar to FIG. 1, and illustrates the lifting mechanism in a fully lowered position.
Figure 3:
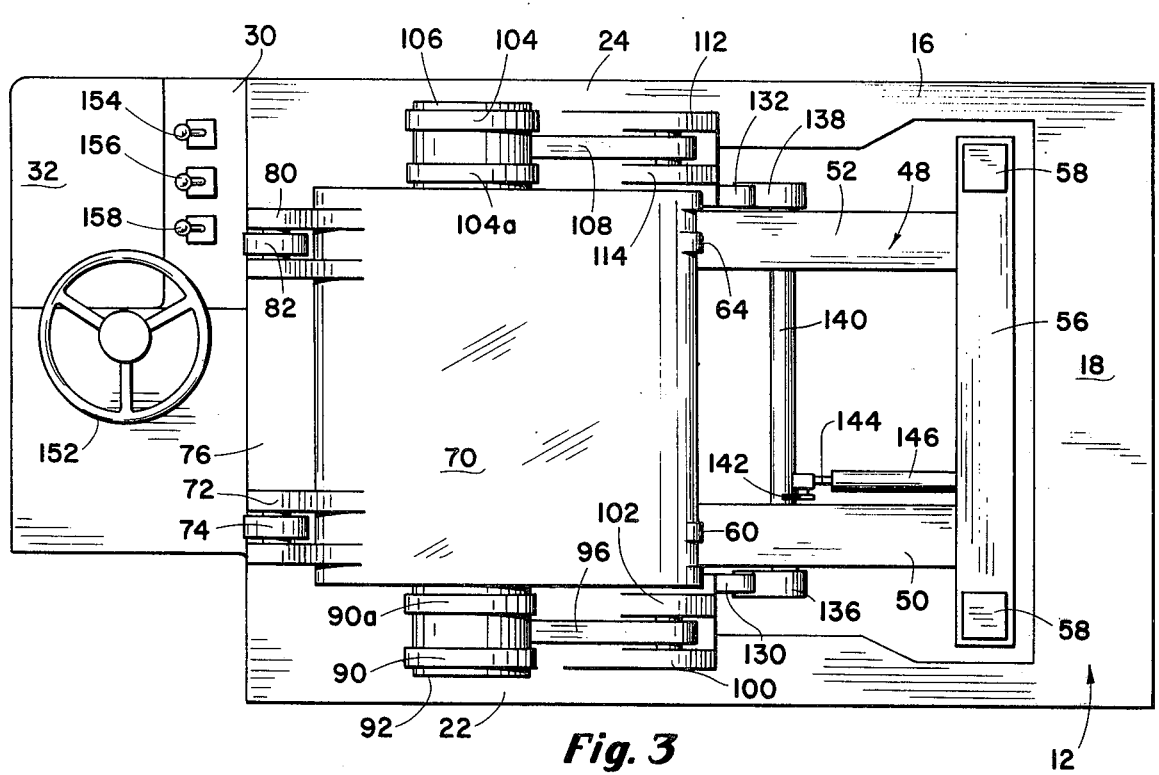
FIG. 3 is a view taken on line 3—3 of FIG. 2.
Figure 4:
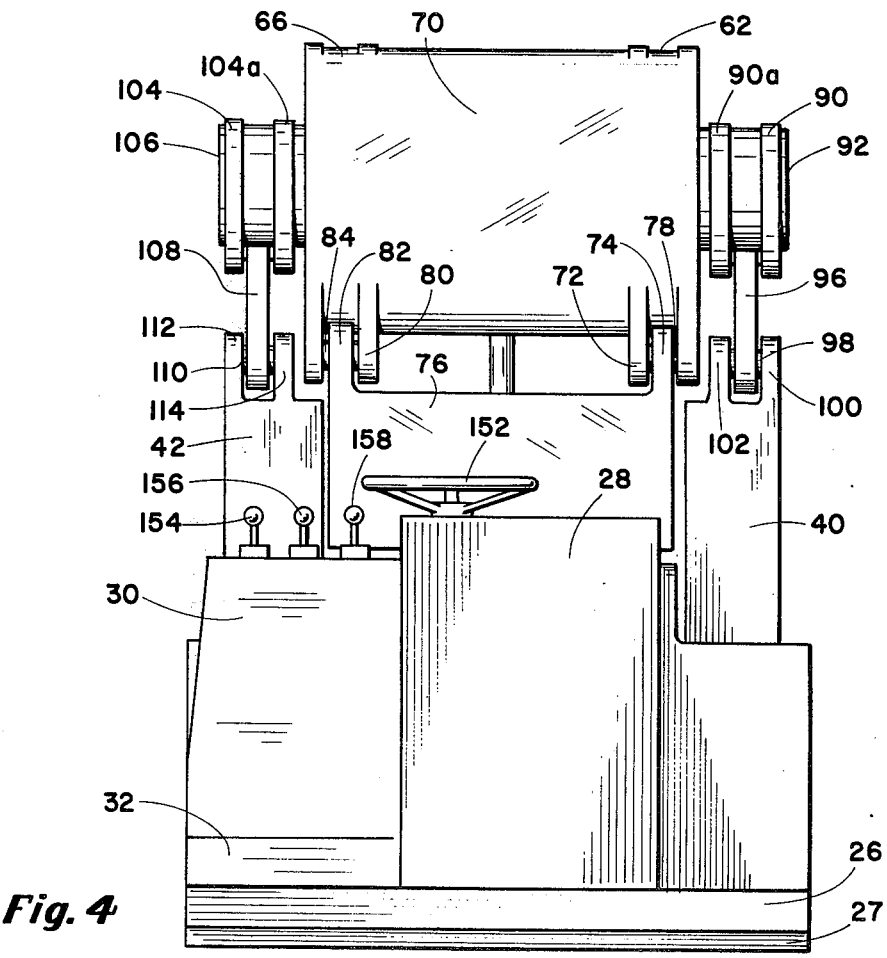
FIG. 4 is a view taken on line 4—4 of FIG. 1.

Referring to the drawings in detail, reference character 10 generally indicates a floor jack comprising a base element 12 of an open frame type construction including a pair of substantially identical mutually parallel spaced side arms 14 and 16 having the outer ends thereof connected by a cross member 18 having a suitable pad member 20 secured on the lowermost edge thereof. The arms 14 and 16 are vertically enlarged along substantially half the length thereof as shown at 22 and 24, respectively, and are connected at the outer extremities thereof by a second cross member 26 having a pad 27 secured along or on the lowermost edge thereof. First and second housing members 28 and 30 are rigidly secured to the cross member 26 and extend outwardly therefrom in a direction away from the first cross member 18 for a purpose as will be hereinafter set forth. It will be apparent from an inspection of the drawings, and particularly FIGS. 3 and 4, that the housing 28 is of a larger overall width than the housing 30, and an operator's platform 32 may be rigidly secured between the housings 28 and 30 for supporting the operator of the apparatus 10 during manipulation thereof, as will be hereinafter set forth in detail. A pair of transversely spaced axially aligned wheels 34 (only one of which is shown in FIG. 2) are suitably journalled on the side arms 14 and 16, and a third wheel 36 is suitably journalled on the housing 28 for cooperating with the wheels 34 to rollingly support the apparatus 10 on the ground 38, or the like, in much the manner of a tricycle wheel arrangement. In addition, the base element 12 and housings 28 and 30 are yieldably supported by the wheels 34 and 36 in any well known manner whereby the base element 12 initially moves vertically downwardly upon loading of the apparatus 10 until the pads 20 and 27 are engaged with the ground 38, for a purpose as will be hereinafter set forth.

Figure 1:
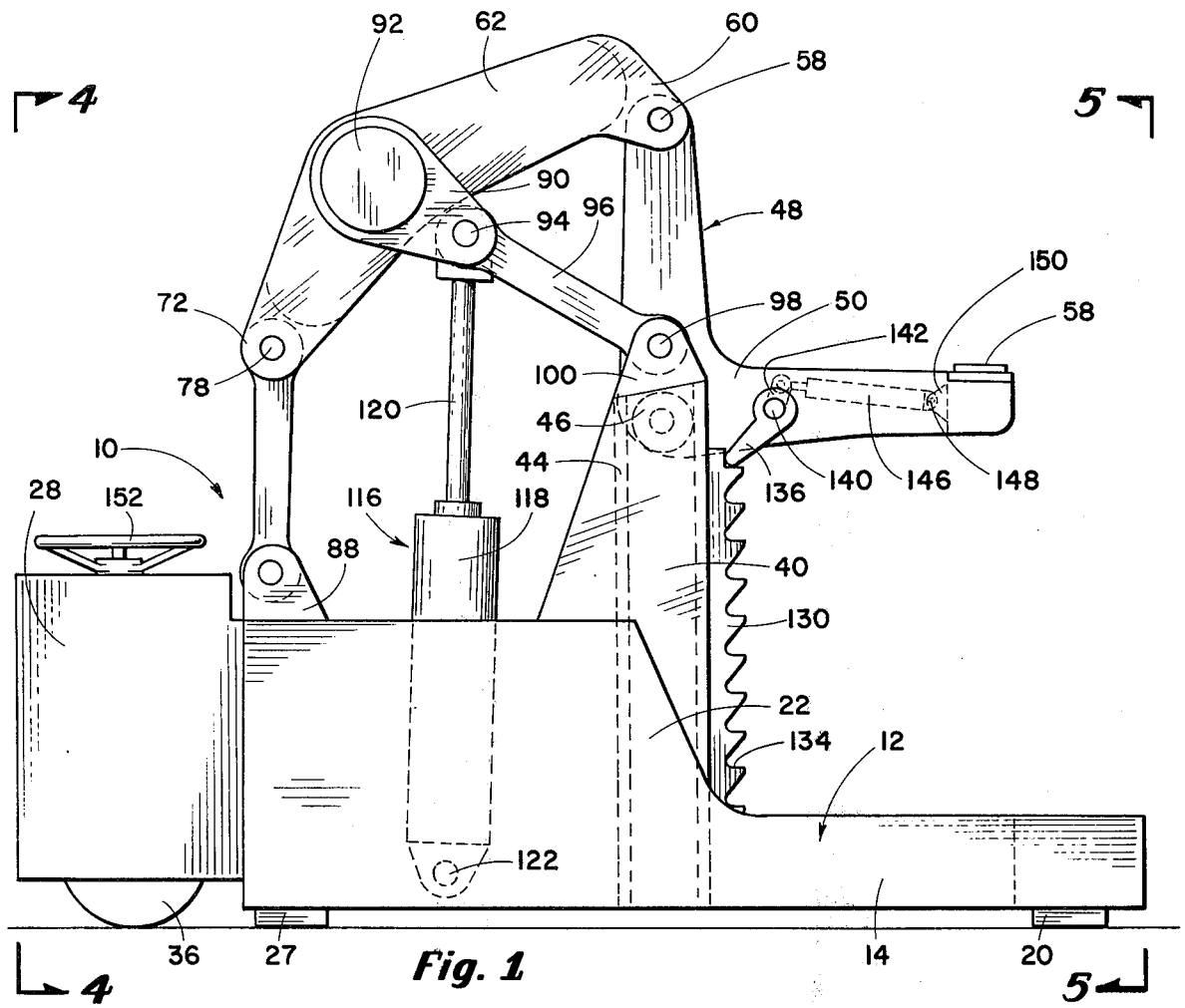
FIG. 1 is a side elevational view of a floor jack embodying the invention illustrating the lifting mechanism in a fully elevated position, and with portions shown in dashed lines for purposes of illustration.
Figure 7:
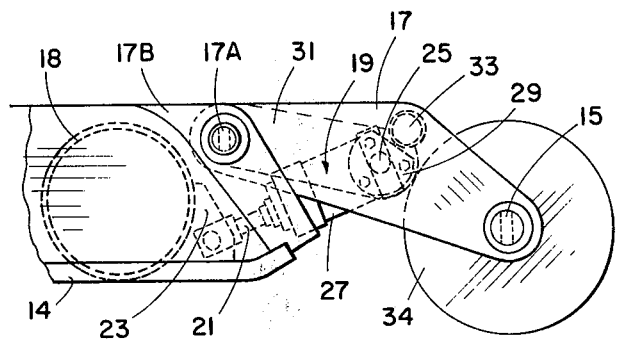
FIG. 7 is a side elevational view of a yieldable support means such as may be utilized in the invention.

By way of example, the arm 14 may be suitable connected to the axle 15 of its respective wheel 34 by a pair of spaced bell crank members 17 (only one of which is shown in FIG. 7). One end of each bell crank 17 is suitably secured to a rod 17A which is suitably journalled between a pair of forwardly extending flanges 17B (only one of which is shown) which are welded or otherwise secured to the cross member 18. (It will be apparent that the cross member 18 may be of a substantially square cross-sectional configuration as shown in FIGS. 1 and 2, or may be of a substantially circular cross-sectional configuration as shown in FIG. 7.) a suitable hydraulic or pneumatic cylinder 19 is substantially centrally disposed between the bell cranks 17 and the piston rod 21 is pivotally secured in any well known manner to a bracket means 23 welded or otherwise secured to the cross member 18. A pair of coaxial pivot shaft stubs 25 extend outwardly from the opposite sides of the cylinder housing 27 and are journalled or pivotally supported in a pair of spaced hub members 29 (only one of which is shown) which are carried by a pair of spaced support flanges 31 (only one of which is shown). The flanges 31 are welded or otherwise secured between the rod or bar 17A and a bar 33 which extends between the bell cranks 17 as a portion spaced from and parallel to the rod 17A. As the piston rod 21 is extended and contracted with respect to the cylinder housing 27, the bell cranks 17 will pivot about the axis of the rod 17A, thus yieldably supporting the body 12 from the wheels 34 whereby the body 12 may be lowered to a position for placing the pads 20 on the ground, or alternately may be raised to a position for facilitating transport of the apparatus 10. Of course, there is no intention of limiting the yieldable support of the body with respect to the wheels to this particular arrangement.

A pair of substantially identical oppositely disposed support members 40 and 42 are welded or otherwise rigidly secured to the inwardly directed faces of the projection members 22 and 24, respectively, and preferably in the proximity of the juncture between the members 22 and 24 and their respective side arms 14 and 16. The support members 40 and 42 may be of any suitable type construction and are each provided with inwardly directed guide channel members 44 (shown in dotted lines in FIG. 1) for receiving suitable roller members 46 therein. The rollers 46 are journalled on the opposite sides of a lift mechanism generally indicated at 48 and are preferably in axial alignment for rolling reciprocally within the respective channels 44 to guide the movement of the lift mechanism 48 during the raising and lowering thereof.

The lift mechanism 48 as shown herein is disposed between the side arm members 14 and 16 and comprises a pair of substantially L-shaped arm members 50 and 52 spaced apart by a cross member 54 rigidly secured between the vertically disposed portions thereof, and a lifting bar or cross member 56 secured between the outer ends of the horizontal portions thereof. It is preferable to provide a plurality of load engaging pads 58 on the upper edge or upper surface of the load lifting cross member 56, as is well known.

The upper end of the vertical portion of the L-shaped arm 50 is pivotally secured at 58 to a bifurcated end 60 of a first lever arm 62. The upper end of the vertical portion of the L-shaped arm 52 is similarly pivotally secured at 64 to a bifurcated end 66 of a second lever arm 68 substantially identical to the lever arm 62 and disposed parallel with respect thereto. In addition, it is preferable to connect the lever arms 62 and 68 by a suitable cross plate or housing 70 to assure coordinated movement therebetween during manipulation of the lift mechanism 48. The levers 62 and 68 are of an angular configuration as clearly shown in FIGS. 1 and 2, and the opposite end of the lever 62 is bifurcated at 72 for receiving a flange 74 of a pivotal cross support 76 therein, and which is pivotally secured thereto at 78. The lever 66 is of a configuration complementary to the configuration of the levers 62, as hereinbefore set forth, and the opposite end thereof is bifurcated at 80 for receiving a flange 82 of the cross support 76 therein, and which is pivotally secured thereto at 84 in axial alignment with the pivot connection 78.

A second pair of spaced flanges 86 (only one of which is shown in FIGS. 1 and 2) are provided on the lower surface of the cross support member 76 and extend in the opposite direction therefrom with respect to the flanges 74 and 82. The flanges 86 are pivotally secured between a pair of complementary flanges 88 provided on the cross member 26, and only one of which is shown in FIGS. 1 and 2.

A flange member 90 has one end thereof rigidly secured to a shaft 92 which is interposed between the pivot connections 58 and 78 and rigidly secured to the lever arm 62 by welding or the like. The opposite end of the flange 90 is pivotally secured at 94 to one end of a crank arm 96, which has the opposite end thereof pivotally secured at 98 between a pair of spaced upstanding flanges 100 and 102 provided on the upright support member 40. Of course, it will be apparent that a pair of substantially identical flanges 90 and 90a (FIGS. 3 and 4) may be rigidly secured to the shaft 92, if desired, in spaced apart relation for receiving the crank 96 therebetween, as is well known. A pair of flanges 104 and 104a similar to the flanges 90 and 90a are rigidly secured at 106 to the opposite end of the shaft 92, and in substantial alignment with the flanges 90 and 90a. A crank 108 similar to the crank 96 has one end pivotally secured between the flanges 104 and 104a in any suitable manner (not shown), and the opposite end thereof is pivotally secured at 110 between a pair of upstanding spaced flanges 112 and 114 provided on the support member 42.

Figure 5:
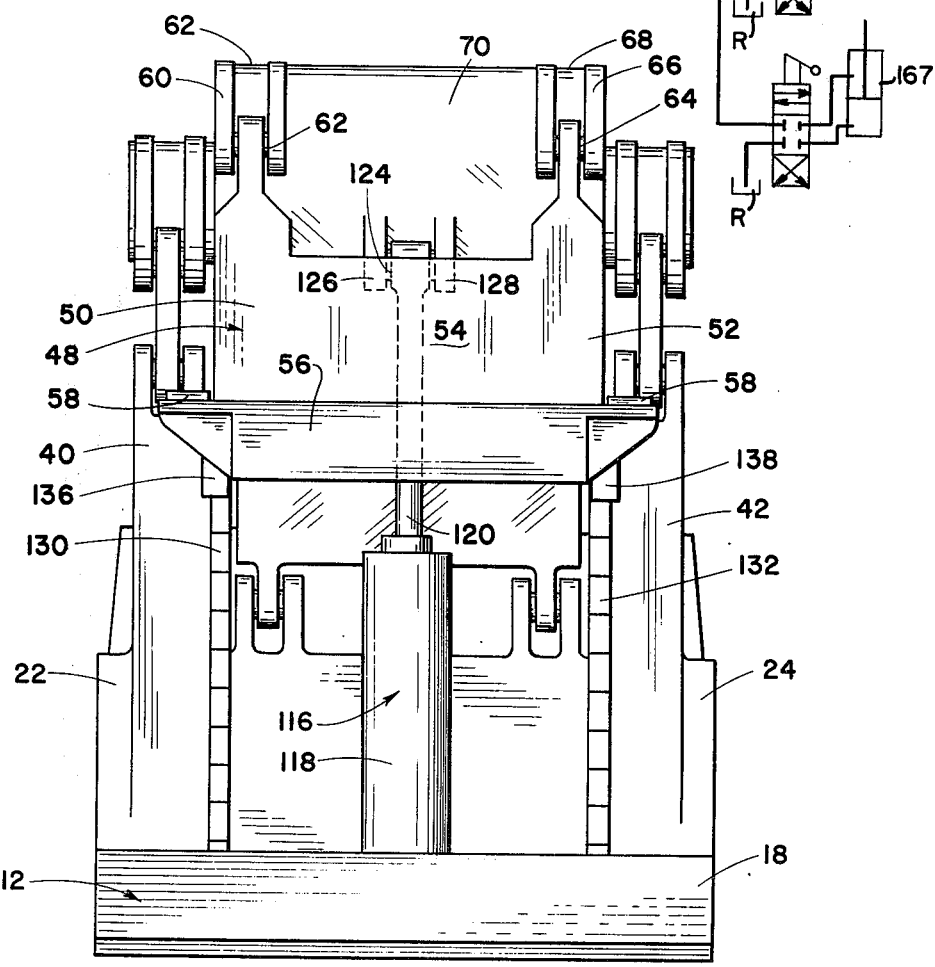
FIG. 5 is a view taken on line 5—5 of FIG. 1.

A hydraulic cylinder generally indicated at 116 is substantially centrally disposed within the apparatus 10 and comprises the usual cylinder housing 118 having a reciprocal piston rod 120. One end of the housing 118 is pivotally secured between the enlarged portions 22 and 24 of the side arms 14 and 16 in any suitable manner, such as by a transversely extending pivot shaft 122, and the outer end of the piston rod 120 is pivotally secured at 124 (FIG. 5) between a pair of spaced, downwardly depending flanges 126 and 128 provided on the undersurface of the cross plate or housing 70.

It will be apparent that the actuation of the hydraulic cylinder 116 for moving the piston rod 120 in a direction toward the fully extended position thereof shown in FIG. 1 causes the lever arms 62 and 66 to pivot simultaneously about the pivot connections thereof in such a manner as to elevate the lift mechanism 48. Conversely, actuation of the cylinder 116 for contracting the piston rod 120 toward the fully contracted position shown in FIG. 2 will pivot the lever arms 62 and 66 in a manner as to lower the lift mechanism 48. The ratio of the distances between the leverage arms, or the distances between the pivot connections of the lever arm 62, support member 76, and flanges 90 and 96 may be particularly selected to provide substantially any desired path of travel for the load engaging bar 56. As shown herein, the particular spacing between the pivot connections, or ratio of lever arm lengths, has been particularly selected to provide a substantially vertical path of travel for the bar 56 during raising and lowering of the lift mechanism 48, but one particular advantage of the construction and design of the apparatus 10 is the versatility of lever arm arrangements possible to provide great versatility of movement for the path of travel for the lift mechanism 48. In addition, whereas the track of channel members 44 as shown herein are substantially vertically disposed, it is to be understood that the track 44 may be angularly disposed with respect to the vertical, if desired.

A pair of spaced, substantially identical mutually parallel and aligned rack or ratchet members 130 and 132 are rigidly secured to the outer vertical edge of the support members 40 and 42, respectively, and are preferably disposed outboard of the L-shaped arms 50 and 52 of the lift mechanism 48. Each rack 130 and 132 is provided with a plurality of vertically spaced, mutually aligned teeth 134 extending in a direction toward the cross member 18. A pair of substantially identical spring urged pawl members 136 and 138 are pivotally secured to the outboard side of the L-shaped arms 50 and 52, respectively, and are arranged for automatically engaging the teeth of the respective racks 130 and 132 for a purpose and in a manner as will be hereinafter set forth. The pawls 136 and 138 may be pivotally secured to the lift mechanism 48 in any suitable manner, and as shown herein, each pawl 136 and 138 is keyed or otherwise secured to a common shaft 140 which is suitably journalled between the arms 50 and 52. A radially outwardly extending flange 142 is rigidly secured to the outer periphery of the shaft 140 and is pivotally secured to the outer end of a piston rod 144 of a suitable air cylinder 146. The air cylinder 146 is pivotally secured at 148 (FIG. 1) to a suitable flange means 150 which is rigidly secured to the cross member or lift bar 56 of the lift mechanism 48. The spring urged pawls 136 and 138 are constantly urged in a direction toward engagement with the teeth 134 of the respective racks 130 and 132, and actuation of the air cylinder 146 is required for releasing the pawls from the locking engagement with the racks, as will be hereinafter set forth.

Figure 9:
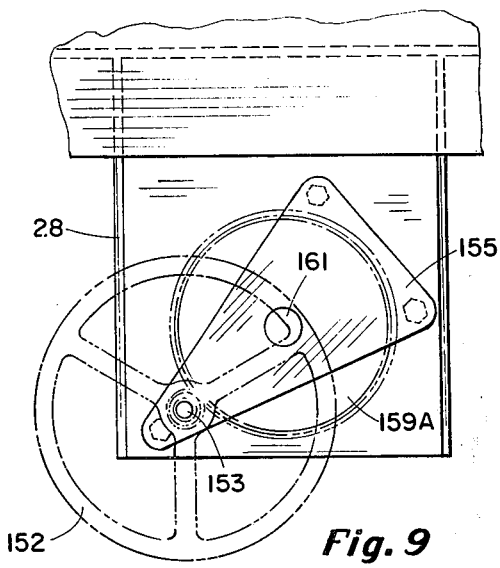
FIG. 9 is a view taken on line 9—9 of FIG. 8 with the steering wheel depicted in broken lines.
Figure 8:
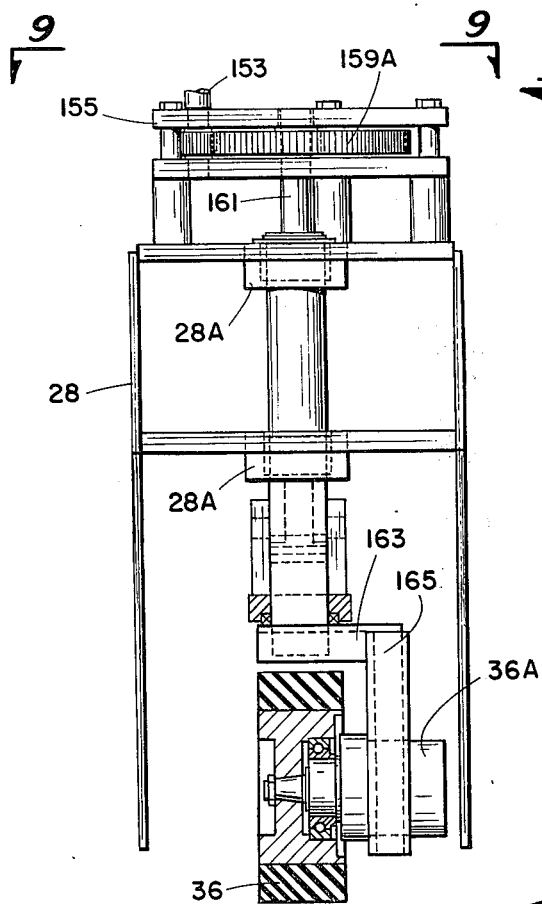
FIG. 8 is an elevational view of a steering assembly such as may be utilized in the invention.
Figure 10:
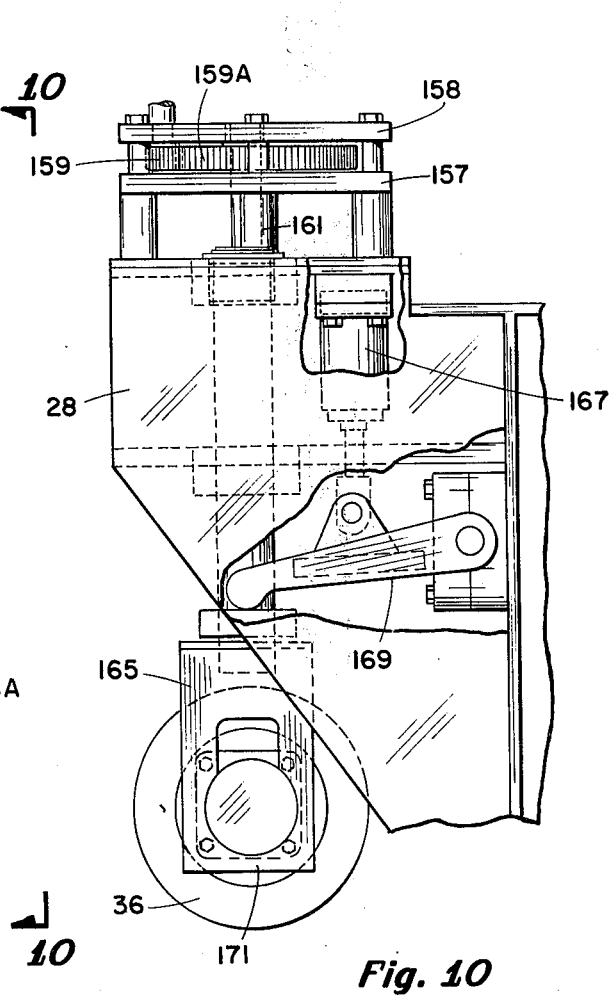
FIG. 10 is a view taken on line 10—10 of FIG. 8.

A suitable steering wheel 152 is mounted on the housing 28 in any well known manner and is operably connected with the wheel 36 for steering control thereof in any well known manner. By way of example, as shown in FIGS. 8, 9 and 10, the steering wheel 152 is carried by a shaft 153 which is off-set and suitably journalled between a pair of spaced plates 155 and 157 suitably supported above the housing 28. A gear member 159 is secured around the outer periphery of the shaft 157 for rotation simultaneously therewith and is in meshing engagement with a gear member 159a which is keyed or otherwise secured to a contrally disposed drive shaft 161. The drive shaft 161 is suitably journalled between the plates 155 and 157 and extends longitudinally through the housing 28 and through suitable bushings or bearings 28A for facilitating rotation of the shaft 161 about its own longitudinal axis. The lower end of the drive shaft 161 terminates at a point slightly above the outer periphery of the wheel 26. An arm member 163 is suitably secured in the proximity of the lower end of the shaft 161 and extends substantially perpendicularly outwardly therefrom for supporting an off-set yoke member 165 which extends downwardly substantially perpendicularly from the arm 163, as particularly shown in FIG. 8. The yoke 165 is bifurcated, as clearly shown in FIG. 10 for receiving the axle 36a of the sheel 36 therethrough. When the steering wheel 152 is manually rotated in the usual manner, the shaft 153 transmits rotation to the drive shaft 161 through the gears 159 and 159A. As the shaft 161 is rotated about its longitudinal axis, the yoke member 165 is moved through an arcuate path by the arm 163, and the engagement of the yoke 165 with the axle 36A alters the planar position of the wheel 36 to provide steering therefor. Of course, there is no intention of limiting the steering to this particular arrangement of parts.

In order to yieldably support the body 12 from the wheel 36, a suitable hydraulic or pneumatic cylinder 167 may be secured to the housing 28 in any suitable manner, as shown in FIG. 10, and may be pivotally secured to a lever arm 169 in the usual manner. The lever arm 169 may have one end pivotally secured to the housing 28 and the opposite end pivotally secured to the drive shaft 161 in any well known manner. A cross member 171 may be secured across the open bifurcated end of the yoke member 165 for retaining the axle 36A in engagement with the yoke 165. Thus, actuation of the cylinder 167 will alternately raise and lower the drive shaft 161 for raising or lowering the position of the wheel with respect to the body 12.

Of course, it is preferable that the steering linkage, valving, motors, and the like, be mounted within the housing 28 for convenience, but not limited thereto. In addition, a plurality of control levers 154, 156 and 158 are preferably suitably mounted on the housing 30 for manual control of the hydraulic and pneumatic circuitry of the apparatus 10, as will be hereinafter set forth, and it is preferable that the conduiting, valving, pumping equipment, fluid reservoir, air connection mechanism, and the like, be suitably mounted in the housing 30 or 28 for convenience, but not limited thereto. It is also preferable that the dimensions of the housings 28 and 30 be selected for mounting of the steering wheel 152 and control levers 154, 156 and 158 at a convenient height for the manipulation thereof by the operator of the apparatus as he stands on the operator's platform 32.

Figure 6:
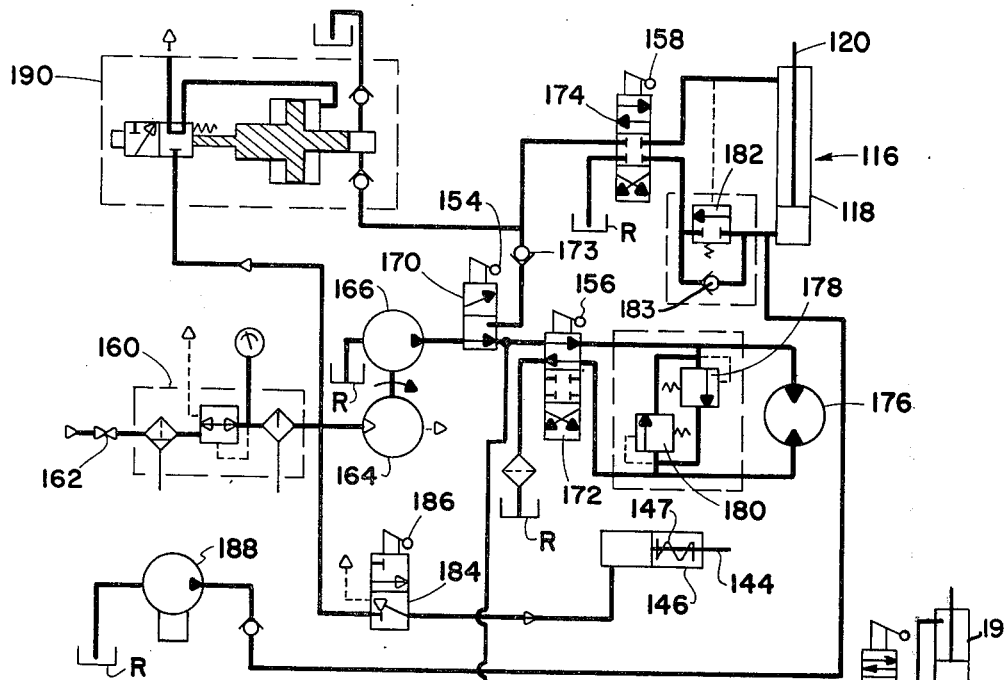
FIG. 6 is a schematic view of the pneumatic and hydraulic circuit of the invention.

Referring now to FIG. 6, the hydraulic and pneumatic circuitry for the apparatus is shown. A suitable filter regulator lubrication unit or apparatus 160 is provided for connection with any suitable air supply, such as the shop air, through a suitable valve 162. The unit 160 is operably connected with a suitable air motor 164 for actuation thereof upon supplying sufficient air pressure thereto, as is well known. The air motor 164 is coupled with or suitably operably connected with a hydraulic pump 166 which is in communication with a fluid reservoir R, and directs fluid to a suitable two position shuttle or slide valve 170 which may be manually actuated by the control lever 154. In one position of the valve 170, the hydraulic fluid is directed to a first three position shuttle valve 172 which may be actuated by the control lever 156, and in the other position of the valve 170, the hydraulic fluid is directed to a second three position shuttle or slide valve 174, which may be actuated by the control lever 158. In addition, a check valve 173 is interposed between the valves 174 and 170 to preclude any accidental back flow of fluid to the valve 170. Furthermore, the air motor 164 and hydraulic pump 166 are preferably selected in relation to each other whereby the air motor will stall out upon reaching a preselected pressure output of the pump 166 to interrupt the operation of the pump as a safety feature for the hydraulic system.

The three position valve 172 is interposed between the reservoir R and a hydraulic wheel motor 176. In a centered or neutral position for the valve 172, no fluid passes therethrough. However, in one shifted position of the valve 172, fluid is directed to the wheel motor 176 in a manner to provide rotation thereof in a direction for forward movement of the apparatus 10, and in a second shifted position of the valve 172, the fluid is directed to the wheel motor 176 in a manner providing reverse rotation thereof for providing reverse movement for the apparatus 10. Suitable spring urged crossover relief valves 178 and 180 may be suitably interposed between the valve 172 and the wheel motor 176 for diverting the fluid flow passing to the wheel motor 176, particularly during shifting of the valve 172 to the central or neutral position thereof. The valves 178 and 180 also provide a dynamic braking action for the propelling wheels 34 and 36.

The three position valve 174 is interposed between the reservoir R and the hydraulic cylinder 116. In a centered or neutral position of the valve 174, no fluid flows therethrough. However, in a first shifted position of the valve 174, fluid is directed to the top of the cylinder housing 118 for moving the piston rod 120 downwardly therein, or toward a contracted position therefor to lower the lift mechanism 48, and in a second shifted position of the valve 174, fluid is directed to the bottom of the cylinder housing 118 for moving the piston rod 120 toward the extended position thereof and for elevating the lift mechanism 48. Suitable pilot operated safety valve or holding valve means 183 is preferably interposed between the valve 174 and the cylinder 116, as is well known, and locks the piston rod 120 against the downward forces of the load during a lifting and/or holding operation as will be hereinafter set forth.

The pneumatic cylinder 146 is operably connected to a two position slide or shuttle valve 184 having a manual actuation lever 186 which may be conveniently mounted on the apparatus 10 as desired. The valve 184 is in communication with the air supply through the unit 160, and in one position of the valve 184, no air is directed to the cylinder 146, and in another position of the valve 184, air is directed to the cylinder 146 for acting against the force of the spring 147 thereof in order to release the pawls 136 and 138 from the locking engagement with the teeth 134 of the rackds 130 and 132.

In addition, it is preferable to provide a suitable hand pump 188 which is in communication with the reservoir R and the bottom of the lift cylinder housing 118 in order that the piston rod 120 may be extended by manual operation of the pump 188, if desired, such as under conditions wherein the air supply may fail, or not be available, or in the event of a break in the main fluid supply line or lines.

Also, it is preferable to provide a suitable intensifier 190 which is in communication with the air supply through the unit 160, and which is also in communication with the reservoir R and the valve 174 as clearly shown in FIG. 6. When air is initially admitted into the system or circuitry, the intensifier is "loaded", as is well known, and hydraulic fluid is constantly supplied to the valve 174, even if the valve 170 is in the position for directing fluid to the wheel motor 174. Thus, a supply of hydraulic fluid is always available at the valve 174. It is to be noted that the check valve 173 is interposed between the valve 170 and the intensifier 190 as well as between the valve 170 and the valve 174. During a lifting operation, it is usually preferable to elevate the lift mechanism 48 relatively rapidly from the lowermost position thereof to the position of initial engagement with the load, thus the combined application of fluid from the valve 170 and intensifier 190 is desirable. When the load is engaged, additional force is usually necessary for efficiently elevating the load, and as well known, the intensifier "senses" the added power requirements and automatically responds for supplying additional hydraulic force to the lifting cylinder 116.

In operation, the floor jack apparatus 10 is normally supported by the propelling wheels 34 and 36 which are in engagement with the ground 38, and may be moved or propelled about the servicing area at the will of the operator of the apparatus. Initially, of course, the air supply is connected with the unit 160 through the valve 162 in the usual manner. Then the operator may stand on the platform 32 and through the proper manipulation of the levers 146 and 156, fluid power is directed to the wheel motor 176 for moving the apparatus 10 in forward and/or reverse directions, and the steering wheel 152 may be utilized in the normal manner for changing the direction of travel for the apparatus 10 as desired. In addition, the tricycle type wheel arrangement is found to provide great versatility of handling and maneuvering of the apparatus during turning thereof.

The jack 10 is maneuvered into a position with regard to the vehicle (not shown) or other load (not shown) to be lifted thereby, and preferably in such a position that the lift bar 56 is disposed under and in substantial alignment with the axle or frame of the vehicle to be lifted. The lever 154 may then be manipulated to divert the flow of the hydraulic fluid to the valve 174, and the lever 156 may be actuated for placing the valve 172 in the neutral position, thus providing a dynamic braking for the propelling wheels 34 and 36. The lever 158 may also be manipulated for shifting of the valve 174 into the position for supplying hydraulic fluid to the bottom of the cylinder housing 118. The piston rod 120 is extended relatively rapidly for elevating the lift mechanism 48 quickly into engagement with the vehicle axle, or the like. Upon engagement with the load, it is usually necessary to apply additional force for lifting thereof. As is well known, the intensifier 190

(sometimes referred to as an air pump) senses this requirement for additional force and automatically shifts for supplying extra power to the lift cylinder 116. As is well known in an intensifier of this type, the ratio between the air pressure and hydraulic pressure acting thereon is sufficiently great that the intensifier will normally pump liquid or hydraulic fluid into a hydraulic system. In the present instance, when the valve 174 is in the centered or neutral position, as shown in FIG. 6, the hydraulic pressure will build up in the intensifier since it cannot be "spent", or since it has nowhere to go. When the hydraulic pressure builds up to a sufficient degree that the air pressure cannot overcome the hydraulic pressure, then the intensifier "stalls" out and cannot pump. As soon as the valve 174 is moved to the position for providing communication with the bottom of the cylinder 116, the excessive hydraulic pressure which has built up in the intensifier 190 is relieved into the hydraulic system flowing into the bottom of the cylinder 116, and this reduces the hydraulic pressure in the intensifier 190 sufficiently that its normal pumping action may be resumed for pumping additional fluid into the system as slong as the valve 174 is in the "lifting" position.

Of course, initially upon engagement of the lift mechanism 48 with the load, the base element 12 will be forced downwardly until the pads 20 and 27 rest on the ground 38 and the wheels 34 and 36 are elevated out of engagement therewith. Subsequently, the lifting force will elevate the load.

As the lift mechanism 48 moves upwardly, the pawls 136 and 138 are constantly maintained in engagement with the teeth 134 of the racks 130 and 132 by the force of the spring 147. Of course, there is no impedence of the upward movement of the lift mechanism 48 since the pawls merely ride along the profile of the teeth 134. However, when the lift mechanism 48 has reached the desired upper limit therefor, the pawls 136 and 138 will automatically engage the teeth 134 in the closest proximity thereto for providing a positive lock for the lift mechanism 48 in the selected elevated position thereof. The pawls 136 and 138 will remain in this locked position until pneumatic force is applied to the latching cylinder 146, thus precluding accidental lowering of the lift mechanism 48. In addition, as hereinbefore set forth, the safety valve or holding valve 182 functions to "lock" fluid pressure beneath the piston rod 120 against the downward force of the load being supported by the lift mechanism 48, thus assuring that there will be no accidental withdrawal or contracting of the rod 120, and further assuring no accidental lowering of the lift mechanism 48.

When it is desired to lower the load and release the lift mechanism 48 from engagement therewith, the lift mechanism 48 must initially be elevated slightly for moving the pawls 136 and 138 out of engagement with the teeth 134, and the latching cylinder 146 must be actuated for overcoming the force of the spring 147 and moving the pawls 136 and 138 in a direction away from any engagement whatsoever with the teeth 134. The valve 158 may then be positioned for applying pressure to the top of the cylinder housing 118 and withdrawing fluid from the bottom thereof in order that the piston rod 120 may be contracted within the housing 118. Of course, the fluid is preferably bled from the bottom of the cylinder housing 118 relatively slowly while the lift mechanism is supporting the load, but as soon as the vehicle is sufficiently in engagement with the ground 38 for releasing the downward force on the lift mechanism 48, the pressure may be relieved more rapidly from the bottom of the cylinder housing 118, if desired, in order to lower the lift mechanism 48 at a relatively rapid rate of speed. Subsequent to the lifting operation, the base element 12 will assume its normal position of support by the propelling wheels 34 and 36, and the jack apparatus 10 may be moved as desired for use at another location or for storage until another lifting operation is required.

From the foregoing it will be apparent that the present invention provides a novel floor jack apparatus particularly designed and constructed for elevating large loads not otherwise readily elevatable, thus facilitating maintenance of heavy equipment, such as extremely large off-highway vehicles, and the like. The novel jack apparatus is readily maneuverable into a position of use, and may be quickly and easily actuated for lifting the vehicle and securely locking the lifting mechanism in the elevated position for precluding accidental dropping or lowering of the elevated load. The compact design of the apparatus enables the device to be used with the largest and heaviest of this type equipment, and with the smaller off-highway vehicles, and the like, with ease. The linkage arms are particularly designed in order that the length ratios therebetween may be specifically selected to provide substantially any desired path of travel for the lift mechanism during raising and lowering thereof, thus providing a versatile and efficient floor jack apparatus for maneuvering of extremely heavy loads.

Whereas the present invention has been described in particular relation to the drawings attached hereto, it should be understood that other and further modifications, apart from those shown or suggested herein, may be made within the spirit and scope of this invention.

What is claimed is:

1. A floor jack apparatus comprising pneumatic motor means adapted for connection with an outside source of air pressure, hydraulic pump means operably connected with the pneumatic motor means and in communication with a fluid reservoir, hydraulic wheel motor means operably connected with the hydraulic pump means for receiving fluid therefrom to provide forward and reverse directions of movement for the floor jack apparatus, hydraulic lift cylinder means operably connected with the hydraulic pump means for actuation thereby to alternate extended and contracted positions, first shuttle valve means operably connected with the hydraulic pump means for selectively directing the fluid to the wheel motor means and/or the lift cylinder means, second shuttle valve means interposed between the first shuttle valve means and the wheel motor means for selective application of the fluid to the wheel motor means to provide said forward and reverse actuation thereof, third shuttle valve means interposed between the first shuttle valve means and the lift cylinder means for selective actuation thereof, safety valve means operably connected with the lift cylinder means, cross-over relief valve means operably connected with the wheel motor means, and intensifier means operably connected with the lift cylinder means for application of auxiliary fluid under load conditions of the lift cylinder.

2. A floor jack apparatus as set forth in claim 1 and including auxiliary hand pump means operably connected with the lift cylinder means for emergency actuation thereof.

3. A floor jack apparatus as set forth in claim 1 and including pneumatically actuated latching means for automatically locking the lift cylinder in the extended position thereof and selectively releasing the lift cylinder for movement to the contracted position thereof.

4. A self-propelled floor jack apparatus comprising base element means for supporting and transporting the jack apparatus, said base element means being yieldably supported by propelling wheel means whereby said base element means may be alternately positioned in engagement with the ground for supporting the jack apparatus during a lifting operation and moved away from the ground during transporting of the jack apparatus, lift means carried by the base element means and movable between lowered and raised positions therefor to raise and lower loads, hydraulic means carried by the base element for selectively lowering and raising the lift means, linkage means cooperating between the hydraulic means and the lift means for determining the path of travel for the lift means during raising and lowering thereof, locking means for automatically locking the lift means in substantially any desired elevated position thereof, power means operably connected with the propelling wheels for self-propelling of the floor jack apparatus, steering means operably connected with the propelling wheel means for controlling the direction of movement of the floor jack apparatus, said hydraulic means comprising cylinder and piston rod means operably connected between the base element means and linkage means for raising and lowering said lift means, shuttle valve means operable for selectively directing hydraulic fluid to the hydraulic cylinder and piston rod means for alternately extending and contracting the piston rod means with respect to the cylinder, safety valve means operably connected with the cylinder and piston rod means for precluding accidental contracting of the piston rod under load conditions, and including intensifier means operably connected with the shuttle valve means to provide a constant supply of hydraulic fluid thereto and for providing auxiliary fluid power to the cylinder and piston rod means under load conditions.

* * * * *